United States Patent [19]
Gehringer et al.

[11] Patent Number: 5,785,866
[45] Date of Patent: Jul. 28, 1998

[54] PROCESS AND APPARATUS FOR THE TREATMENT, IN PARTICULAR PURIFICATION OF WATER CONTAINING HALOGENATED ETHYLENES

[75] Inventors: Peter Gehringer; Emil Proksch, both of Vienna; Walter Szinovatz, Hornstein; Helmut Eschweiler, Vienna, all of Austria

[73] Assignee: Osterreichisches Forschungszentrum Seibersdorf GmbH, Vienna, Austria

[21] Appl. No.: 683,741

[22] Filed: Jul. 17, 1996

Related U.S. Application Data

[63] Continuation of Ser. No. 828,805, PCT/AT90/00069 filed Jul. 13, 1990.

[30] Foreign Application Priority Data

Aug. 8, 1989 [AT] Austria ................................ 1901/89

[51] Int. Cl.$^6$ ................................. C02F 1/30; C02F 1/78
[52] U.S. Cl. ........................ 210/748; 210/760; 210/192
[58] Field of Search ..................... 210/748, 760, 210/243, 192; 250/432 R, 435–438; 422/22–24, 186.07–186.13

[56] References Cited

U.S. PATENT DOCUMENTS

| | | | |
|---|---|---|---|
| 1,266,803 | 5/1918 | Henri et al. ............................... | 422/24 |
| 3,833,814 | 9/1974 | Nablo ........................................ | 250/492 |
| 3,899,685 | 8/1975 | Francis et al. ............................ | 250/536 |
| 3,901,867 | 8/1975 | Trump ....................................... | 210/198 |
| 3,924,139 | 12/1975 | Hirose et al. ............................. | 250/527 |
| 4,093,419 | 6/1978 | Tauber et al. ............................ | 250/428 |
| 4,230,571 | 10/1980 | Dadd ......................................... | 210/760 |
| 4,265,747 | 5/1981 | Copa et al. ............................... | 210/758 |
| 4,273,660 | 6/1981 | Beitzel ...................................... | 210/760 |
| 4,274,970 | 6/1981 | Beitzel ...................................... | 210/760 |

(List continued on next page.)

FOREIGN PATENT DOCUMENTS

| | | | |
|---|---|---|---|
| 2503010 | 7/1976 | Germany ................................... | 210/764 |
| 2546756 | 4/1977 | Germany . | |
| 51-031061 | 3/1976 | Japan ........................................ | 210/748 |
| 55-84589 | 6/1980 | Japan . | |
| 57-006560 | 2/1982 | Japan ........................................ | 210/748 |
| 9029084 | 2/1984 | Japan ........................................ | 210/748 |
| 2164490 | 6/1990 | Japan ........................................ | 210/748 |
| WO 85/04160 | 9/1985 | WIPO ................................... | C02F 1/32 |

OTHER PUBLICATIONS

Klinger, "Continuous Method and Device for Destroying Pathogenic Organisms in Waste Water Sewage Sludge" Translation of German Patent 2546756 (Apr. 1977).

"Method for Irradiating Radiations on a Liquid or Slurry" Translation of Japanese Kokai 57–6560 (Feb. 1982).

"Water Tretament Method and Water Treatment Device" Translation of Japan 2–164490 (1990).

Getoff, "Advancements of Radiation Induced Degradation of Pollutants in Drinking and Waste Water" pp. 585–594, 1989; Presented in part at the IAEA Advisory Group Meeting, Bologna, Italy, Nov. 1988.

(List continued on next page.)

*Primary Examiner*—Cynthia L. Nessler
*Attorney, Agent, or Firm*—Greenblum & Bernstein P.L.C.

[57] ABSTRACT

Process and apparatus for treating water containing halogenated ethylenes, preferably ground water, for use and consumption by humans and animals, in which the water is exposed to the action of ozone and to high energy, in particular ionizing radiation. In a preliminary treatment, ozone is added to and/or mixed with water of essentially drinking water quality except for the above-mentioned halogenated ethylene constituents and harmful substances. The circulating water is then irradiated with electrons. The ozone concentration immediately after leaving the irradiated region is at least 0.1 ppm.

10 Claims, 1 Drawing Sheet

U.S. PATENT DOCUMENTS

| | | | |
|---|---|---|---|
| 4,396,580 | 8/1983 | Patrick et al. | 422/186 |
| 4,453,079 | 6/1984 | Woodbridge | 250/432 R |
| 4,915,916 | 4/1990 | Ito et al. | 422/186 |
| 5,043,079 | 8/1991 | Hallett | 210/760 |
| 5,114,576 | 5/1992 | Ditzler et al. | 210/195.1 |
| 5,120,450 | 6/1992 | Stanley, Jr. | 210/748 |
| 5,275,741 | 1/1994 | Miano et al. | 210/748 |
| 5,348,665 | 9/1994 | Schulte et al. | 210/748 |

OTHER PUBLICATIONS

Peyton, G.R.; Glaze, W.H., "Destruction of Pollutants in Water with Ozone in Combination with Ultraviolet Radiation. 3. Photolysis of Aqueous Ozone", *Environ. Sci. Tech.*, 1988, vol. 22, No. 7, pp. 761–767.

Arisman, R.K.; Musick, R.C.; Zeff, J.D.; Crase, T.C., "Experience in Operation of a Ultraviolet–Ozone (ULTROX) Pilot Plant for Destroying Polychlorinated Biphenyls in Industrial Waste Influent", *Chemical Abstracts*, vol. 95, 1981, Abstract No. 29749y.

Gehringer, V.P.; Proksch, E.; Szinovatz, W.; Eschweiler, H. "Radiation–Chemical Degradation of Traces of Trichloroethylene and Perchloroethylene in Drinking Water", *Z. Wasser–Abwasser–Forsch.*, vol. 19, pp. 196–203.

P. Gehringer et al., "Decomposition of Trichloroethylene and Tetrachloroethyne in Drinking Water by a Combined Radiation/Ozone Treatment," *Wat. Res.*, vol. 22, No. 5, United Kingdom, 1988, pp. 645–646.

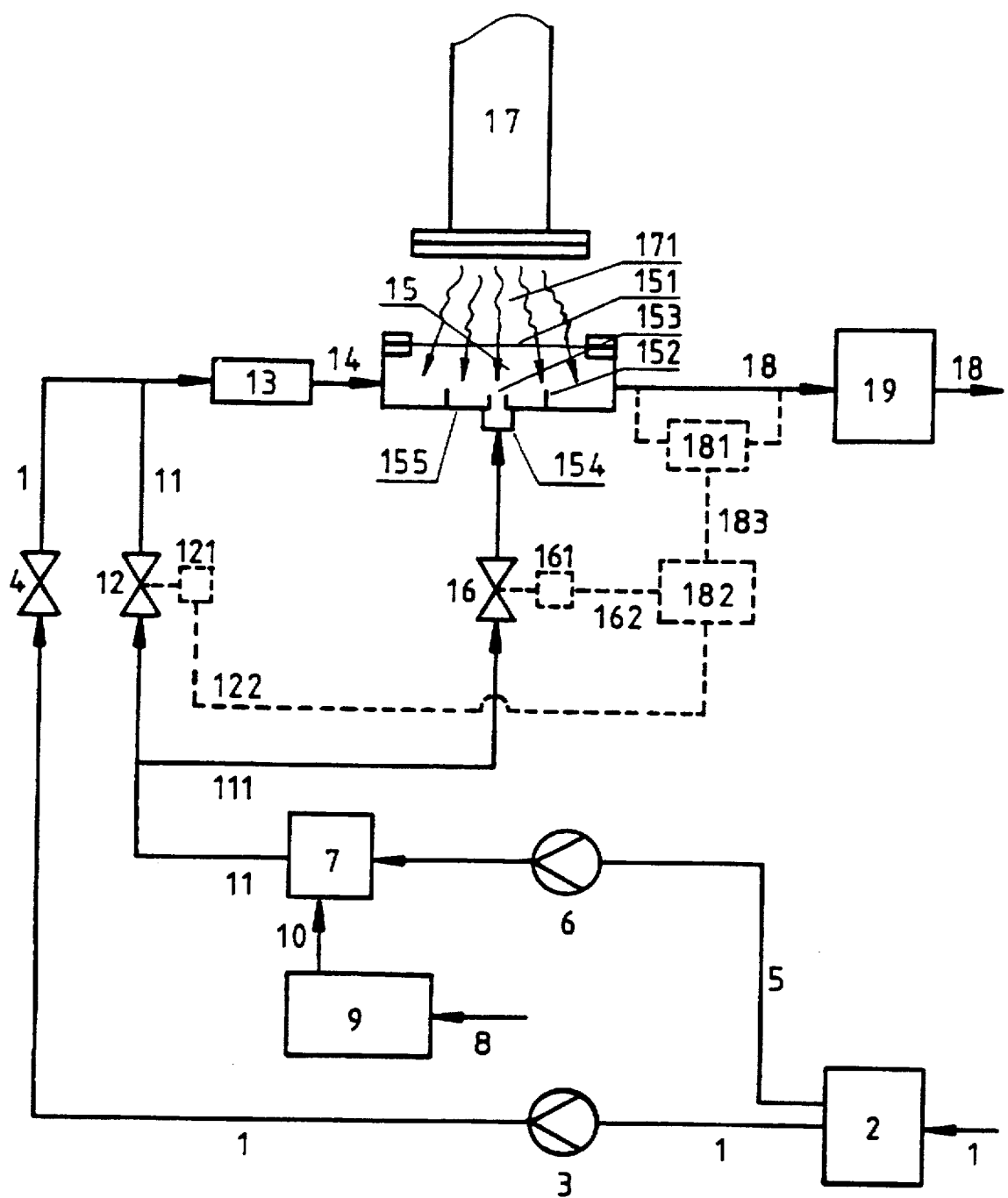

PROCESS AND APPARATUS FOR THE TREATMENT, IN PARTICULAR PURIFICATION OF WATER CONTAINING HALOGENATED ETHYLENES

This application is a continuation of U.S. Ser. No. 07/828805, filed Feb. 7, 1995, now abandoned, which is a 371 of PCT/AT90/00069, filed Jul. 13, 1990.

BACKGROUND OF THE INVENTION

1. Field of the Invention

The invention relates to a process for the treatment, in particular the purification, of water, preferably ground water, containing halogenated ethylenes, for the use and consumption of humans and animals, as well as apparatus for carrying out the process.

2. Description of Background and Relevant Information

Environmental changes and the increasing pollution of waters jeopardize to an ever increasing extent the waters provided for the use and consumption by humans, but also animals and plants which feed fountains or wells as ground water or are recovered from stagnant or flowing surface waters. In recent years, the main problem has been caused by the contamination of the waters by halogenated hydrocarbons, in particular tri- and perchloroethylene, sometimes also dichloroethylene, as a consequence of the careless use of solvents in commerce, households and industry, as it turned out that this problem cannot be solved in a satisfactory manner by the available treatment methods suitable for high throughputs.

A process which is currently used for supplying densely populated areas with drinking water in which the content in halogenated hydrocarbons is reduced below the admissible maximum limits consists in the adsorption of these contaminants on activated carbon. A substantial drawback of this method, in addition to its moderate effect, is that in the regeneration of the activated carbon, the contaminants removed from the waters are released unchanged and must then be discarded separately.

In the search for effective methods, it was found that a treatment of the contaminated waters with oxidants such as chlorine, hydrogen peroxide or ozone contributes virtually nothing to a substantial degradation of the halogenated olefins. Other investigations, in which waters polluted in this manner were subjected to a combined treatment with ozone and ultraviolet light, as described by G. Peyton and W. Glaze in Environ. Sci. Technol. 22:761–767 (1988), showed that their capacity is much too low for treatment of the throughput volume required for water supply. The treatment of waters containing polychlorinated biphenyls, also by means of ultraviolet irradiation in the presence of ozone, is known from Chemical Abstracts 95 (1981) 29749y. But as the decomposition of aromatic compounds of this type is different from that of halogenated olefins, a prediction as to the effectiveness of this method for a decomposition of halogen olefins which occurs via different intermediaries and radicals is not possible; added to this are the aforementioned drawbacks in respect of throughput volumes. The method according to WO85/04160, which is also based on the use of ultraviolet irradiation combined with ozone, is directed to the decomposition of solids such as resins containing radioactive contaminants. In that case, the decomposition takes place after first suspending the solid in water at a comparatively high concentration. This publication does not offer a solution of the constellation of problems of a degradation of the entirely different halogen olefins present in natural waters in very low concentrations. Experiments with γ-irradiation on a scientific basis show that although useful degrees of degradation were obtained, the periods required therefor were too long due to the low dose rate and only low throughputs were possible in this case, as well, as described in the publication of Gehringer et al. Z. WasserAbwasser-Forsch. 19:196–203 (1986).

In experiments with treatment of contaminated waters by electron irradiation, it was found that as compared to γ-irradiation, much higher irradiation doses are required for a certain percentage of decomposition of halogenated hydrocarbons.

In investigations on the effect of γ-irradiation combined with ozone, such as they have been described, for instance, by Gehringer et al. in Water Res. 22:645–646 (1988), an essential increase of the degradation rate of halogenated olefins was observed, although it is still not possible to develop technical processes for water treatment on the basis of the effect observed in these investigations.

SUMMARY OF THE INVENTION

It is an object of the present invention to develop a process for the treatment of waters contaminated by halogenated olefins which permits an effective decrease of these contaminants in the waters at the large throughput volumes usual for water supplies and with less expenditure in comparison to the decontamination using the above-described activated carbon.

It was surprisingly found that on exposure to electron irradiation at simultaneous maintenance of given ozone concentrations in the water to be treated, high decomposition rates with throughputs increased by several orders of magnitude as compared to exposure to other types of rays and ozone are obtainable.

The object of the invention is therefore to provide a process of the type initially mentioned wherein the waters are subjected to the effect of ozone and high energy, in particular ionizing, irradiation which consists in that a body of water, in particular ground water, essentially brought to or having drinking water properties in regard to the components and/or contaminants present with the exception of the aforementioned halogenated ethylenes and containing ozone from a previous treatment and/or to which ozone was added, is exposed to electron irradiation preferably during flow, the ozone content of the water being kept at a value of at least 0.1 ppm in the entire area of electron irradiation exposure.

As to the mechanism of action of electron irradiation in the presence of ozone, it is to be noted that halogenated olefins virtually do not react directly with ozone, and that instead their decomposition takes place by the action of OH radicals formed of the water to be treated and by reaction of certain water radiolysis products with ozone. The advantage of electron irradiation in the presence of ozone is that in spite of the use of high irradiation doses—which would make one expect a high rate of recombination of the OH radicals to $H_2O_2$ molecules of little effect for the decomposition—the required OH radicals are formed not only via excitation states of the water, but also via the hydrated electrons formed due to ionization, thus in selectively high yield beneficial for obtaining high decomposition rates.

Halogenated ethylenes are globally understood to mean, in particular, halogen-containing hydrocarbons with an olefinic double bond, tri- and tetrachloroethylene and possibly dichloroethylene at present being among the substances causing problems in water.

"Area of electron irradiation exposure" is understood to mean that volume portion of the flowing body of water resulting from the area of the electron-permeable window of a flow chamber multiplied by its height.

The maintenance of a minimum concentration of ozone over the irradiation area previously mentioned is assured if this minimum concentration is still not fallen below at the site where the water leaves the irradiation area.

When keeping within the aforementioned conditions, it was found that a synergism not fully understood up to now becomes active and substantially exceeds the superadditive effect of the combination of γ-irradiation with ozone observed up to now in the decomposition of halogenated ethylene in water.

A particular advantage of the invention resides in the fact that unexpectedly high throughputs of water to be decontaminated can be obtained at high decomposition rates of the aforementioned contaminants, which is particularly important for the sanitation of ground water reserves of drinking water quality per se, but contaminated with minor amounts of chlorinated ethylenes inadmissible for human consumption, such as, for instance, those of the reserves of the Sink of Mitterndorf essential for the water supply of the East of Austria. A further substantial advantage is that due to a genuine decomposition of the halogenated olefins to completely biocompatible substances, such as mainly carbonic acid and chloride ions, a subsequent disposal of the contaminants separated from the water, such as necessary in the process using activated carbon, is not required.

It was found that keeping within the aforementioned minimum concentration of ozone is conveniently facilitated according to a favorable variant of the process by adjusting the concentration of ozone in the water to be treated on entering the electron irradiation exposure area to a minimum of 1 ppm, preferably between 1 ppm and 10 ppm.

For achieving the throughputs necessary for water supply systems, it is technically convenient to subject the water containing ozone to an electron irradiation of an energy of at least 0.5 MeV. At this minimum energy, the penetration depth of radiation into the water amounts to 1.4 mm, which combined with an appropriate selection of conditions in plant geometry permits throughputs adequate for a sufficient supply.

The new process is particularly suitable for those low concentration ranges where a conventional decomposition would take too long due to high degrees of dilution. At concentrations of chlorinated olefins of essentially less than about 1 ppm, it was even possible to observe an acceleration of the extent of decomposition as compared to higher values.

It is thus preferable to expose water with a content in halogenated ethylenes of up to 1,000 ppb to the action of ozone and electron irradiation.

If, according to a further favorable embodiment of the invention, it is provided that the maintenance of the aforementioned minimum concentration of 0.1 ppm of ozone is assured by adding additional ozone to the flowing water directly in the area of electron irradiation exposure, preferably transverse to the direction of flow, preferably in the form of strong water enriched in ozone, the content of waters in halogenated olefins could be decreased or eliminated even if they contained higher amounts of bicarbonates and nitrates.

It was found that a particularly convenient use of the synergism between electron irradiation and ozone content can be achieved by mixing that volume portion of the ozone-containing water facing the penetrating electron beam at a high degree of mixing with the remaining volume portion of the water flowing through the area of electron irradiation exposure, preferably by generating turbulent flow.

This measure permits the distribution of contaminant decomposition from the volume portion close to the radiation source over the entire exposure area. This in turn allows a considerable increase in throughput or, if this is not required, an electron accelerator of lower output will suffice.

A further object of the invention is an embodiment of an apparatus for carrying out the process previously described particularly convenient in view of an optimized utilization of electron irradiation.

The apparatus according to the invention is provided with at least one electron accelerator and at least one irradiation exposure chamber disposed in the area of its cone of rays and equipped with inlets and outlets for fluid medium flowing through it, which chamber is preferably provided on its side facing away from radiation exposure with orifices for the supply of an ozone-containing, fluid medium, is characterized in that essentially at the start of the discharge line disposed downstream of the flow chamber flowable by the waters containing halogenated ethylenes, a sensor for detecting the ozone content is disposed and connected via a control to at least one actuator for at least one flow regulating organ for at least one strong water feed line.

By means of this apparatus, the ozone content in the flow chamber can be regulated particularly precisely and economically. The sensor can be formed, for instance, in a by-pass branching off from the discharge line of the flow chamber as the flow cell of a UV spectrophotometer.

A further object of the invention is the use of an apparatus of the type previously described having at least one electron accelerator and at least one irradiation exposure chamber arranged in the area of the cone of rays of the accelerator and provided with inlets and outlets for fluid medium flowing through it, the chamber preferably being provided on its side facing away from irradiation exposure with orifices for the supply of an ozone-containing, fluid medium, with the proviso that the chamber is passed by a flow of water containing halogenated ethylenes and that strong water enriched in ozone and/or ozone is added to the water via said orifices, with a sensor being disposed substantially at the start of the discharge line disposed downstream of the flow chamber for detecting the ozone content and connected via a control to at least one actuator for at least one flow regulating organ for at least one strong water feed line to the orifices, for the treatment, in particular, the purification, of waters containing halogenated ethylenes for the use and consumption of humans and animals according to the process described above and its preferred embodiments.

In order to maintain a particularly constant ozone concentration in the contaminated water to be exposed to electron irradiation, a convenient variant of use of the invention provides for the side of the chamber facing away from electron irradiation exposure to be partly formed as a perforated tray or frit.

One variant of the apparatus which is of comparatively simple construction, but quite adequate for the intended effect of a high degree of decomposition, is so equipped at the bottom of the chamber is provided essentially in the area of half the path of flow of the water with at least one row of orifices or nozzles arranged transversely to the direction of flow for supplying strong water enriched in ozone and/or ozone.

The degree of utilization of electron irradiation and added ozone can be conveniently enhanced if means for generating turbulent flow are arranged in the radiation exposure chamber.

With an arrangement like this, the water flowing through the chamber previously described can be present in a layer thickness essentially exceeding the penetration depth of electron irradiation even at low penetration depth.

BRIEF DESCRIPTION OF THE DRAWING

The single drawing FIGURE schematically represents a preferred embodiment of the invention.

DETAILED DESCRIPTION OF THE PREFERRED EMBODIMENTS

The invention is explained in detail on the basis of the following example.

EXAMPLE

To two different bodies of water A and B, namely from the water supply of Vienna and spring water from a rural area (Bucklige Welt) whose composition is evident from Table 1, tetrachloroethylene and trichloroethylene were added in the starting concentrations indicated in column 1 of Table 2.

TABLE 1

|  | total hardness DH° | $HCO_3$ ppm | $NO_3$ ppm | Cl ppm | $SO_4$ ppm |
|---|---|---|---|---|---|
| Water A | 9.6 | 195 | 6.5 | 4.5 | 31 |
| Water B | 9.5 | 99 | 4 | 5 | 21 |

By means of δ-ray source (Co-60) with a dose rate of approximately 1.5 Gy/s (=Gray/second) and by means of an 0.5 MeV electron accelerator essentially corresponding to the diagram of the system represented in the drawing, the bodies of water A and B were irradiated at a water temperature of 10° C. with the concentrations of chlorinated ethylenes indicated above, the irradiation in each case being carried out with and without the addition of ozone, at a concentration of about 3 ppm of $O_3$ for waters A and B containing trichloroethylene and about 5 ppm of $O_3$ for waters A and B containing tetrachloroethylene.

The degrees of decomposition of 90, 95 and 99 percent determined in these investigations are evident from columns 3, 5, 7 and 9 of Table 2.

On the basis of these experimentally determined dose values, maximum obtainable throughputs in $m^3/h$ were calculated, on the assumption that a technically still feasible Co-60 gamma ray source with 1 MCi Co-60 activity corresponding to a rate of about 13 kW and an electron ray source in the form of a technically conventional electron accelerator in the higher rate range with an energy of 3 MeV and a beam current of 50 mA, corresponding to a rate of 150 kW, would be available for irradiation. The corresponding data are contained in columns 4, 6, 8 and 10.

TABLE 2

| 1 | 2 | 3 | 4 | 5 | 6 | 7 | 8 | 9 | 10 |
|---|---|---|---|---|---|---|---|---|---|
|  | Degree | γ-irradiation | | | | Electron Irradiation | | | |
| Water/ | of | without $O^3$ | | with $O_3$ | | without $O_3$ | | with $O_3$ | |
| Contaminate | Degradation % | dose Gy | through-put $m^3/h$ | dose Gy | through-put $m^3/h$ | dose Gy | through-put $m^3/h$ | dose Gy | through-put $m^3/h$ |
| Water A | 90 | 185 | 253 | 50 | 936 | 390 | 1385 | 48 | 11250 |
| 100 ppb | 95 | 240 | 195 | 65 | 720 | 600 | 900 | 68 | 7941 |
| tetra-chloro-ethylene | 99 | 370 | 126 | 100 | 468 | 1220 | 443 | 105 | 5143 |
| Water A | 90 | 100 | 468 | 10 | 4680 | 205 | 2634 | 9 | 60000 |
| 100 ppb | 95 | 130 | 360 | 20 | 2340 | 385 | 1403 | 21 | 25714 |
| tri-chloro-ethylene | 99 | 195 | 240 | 60 | 780 | 1050 | 514 | 60 | 9000 |
| Water B | 90 | 96 | 487 | 14 | 3343 | 135 | 4000 | 15 | 36000 |
| 100 ppb | 95 | 125 | 374 | 25 | 1872 | 190 | 2842 | 25 | 21600 |
| tetra-chloro-ethylene | 99 | 193 | 242 | 50 | 936 | 425 | 1270 | 52 | 10385 |
| Water B | 90 | 58 | 807 | 9 | 520 | 90 | 6000 | 10 | 54000 |
| 100 ppb | 95 | 75 | 624 | 11 | 4255 | 160 | 3375 | 11 | 49090 |
| tri-chloro-ethylene | 90 | 115 | 407 | 20 | 2340 | 425 | 1270 | 22 | 24545 |

A comparison of the dose values obtained for the various samples of waters A and B shows the unexpected effect of the decomposition of contaminants by means of electron irradiation combined with ozone.

It is evident that in the absence of ozone in the waters when using electron irradiation at identical degrees of decomposition, in particular where these increase, substantially higher doses than when using gamma irradiation are required, as for instance for decomposition of 90 and 99 percent, the doses on using electron radiation as compared to those of gamma radiation increase by a factor of about 2 to about 4 to 5. It was surprisingly found that in the presence of ozone, the doses obtained by using electron irradiation were virtually identical to those obtained by using gamma irradiation. The concerted use of ozone thus permits decomposition rates of contaminants by means of electron irradiation which are equal to those obtained by means of gamma rays.

The throughput values computed in support of the significance of these results for practice show that the throughputs obtainable by using electron irradiation combined with ozone are about five to twelve times as high as those obtainable by means of gamma irradiation combined with ozone.

The drawing serving for the further explanation of the invention shows a diagrammatic representation of a preferred embodiment of a plant provided for carrying out the new process with particular emphasis placed on the flow chamber to be exposed to electron irradiation.

In the plant diagrammatically represented in the drawing and serving for the treatment of waters contaminated with chlorinated olefins, a main stream of the water containing the contaminants is fed via line 1, a buffer container 2 and a pump 3, a partial stream of the water being fed from container 2 via a branch line 5 by means of pump 6 into a container with ozone and strong water and a mixer 7 which is in turn supplied via line 10 with ozone from the ozonizer 9 fed with oxygen via a line 8. In the container 7, "strong water" enriched in ozone is produced and conveyed via line 11 to that for still untreated starting water via the aforementioned line 1, whereupon the united streams 1 and 11 are intimately mixed in the mixer 13 for adjusting a desired starting concentration of ozone. The ozone-containing water thus obtained and to be decontaminated is fed via line 14 into flow chamber 15 with electron-permeable window 151 disposed underneath an electron accelerator 17 with exposure area 171, the water flows through the chamber and is exposed to electron irradiation in area 171. Approximately at half of the flow path, the bottom 155 of the chamber 15 is provided with a row of nozzle orifices 153 communicating with an inlet channel 154 and serving for assuring a minimum concentration of ozone in the chamber 15 by means of a partial stream Ill branching off from the strong water line 11 and leading directly into the irradiation chamber 15. Chamber 15 is provided with elements such as baffle plates 152 for increasing the effect by generating turbulent flow. In the chamber 15, the chlorinated ethylenes are decomposed to biocompatible substances due to the aforementioned synergism between electron radiation and ozone. The treated water now present in the chamber 15 is discharged via a line 18 provided with a balance vessel 19 and can be directly fed into a water supply system. The flow regulating organs 4, 12 and 16 represented in the drawing serve for a mutually adapted adjustment of the streams of water to be treated and ozonized strong water.

The dotted lines represent a preferred embodiment of an adjustment of the apparatus according to the invention.

At line (8), which exits flow chamber (15), a sensor (181) constituted of a not illustrated spectrophotometer is arranged by means of a by-ass, said sensor is connected to a signal line (183) via a control (182). In the embodiment show, two control lines (162, 122) of regulating units (161, 121) originate from control (182) for valves (16) and (12) in strong water branch current line (111) and strong water line (11). In this manner, the ozone supply can be controlled in the water fed to the flow chamber as well as in the chamber itself.

The apparatus described can also have a flow chamber without windows (151). In this case, precautions must be taken for disposal of contaminants having passed from the water to the gas phase.

We claim:

1. A method of using an apparatus having at least one electron accelerator and at least one irradiation exposure chamber arranged in an area of a cone of rays emitted by said at least one electron accelerator, said at least one chamber having at least one inlet and at least one outlet for a flowing fluid medium and said inlet and said chamber having a height greater than the penetration depth of the electrons from said at least one electron accelerator, said method comprising:

passing a flow of water to be treated through the at least one inlet of the at least one chamber, across a portion of the at least one chamber, and through the at least one outlet such that the flow of water forms a water depth; and adding ozone to the flow of water and exposing a portion of the water depth to electron radiation such that the penetration depth into the water of the electrons from said at least one electron accelerator is less than the water depth of the flow of water in the chamber, for treatment of the water for at least one of use and consumption by humans.

2. The method according to claim 1, wherein:

the at least one chamber further comprises orifices on a side of the at least one chamber facing away from irradiation exposure, the method further comprising supplying an ozone-containing fluid medium to water flowing through the orifices.

3. The method according to claim 2, wherein:

the side of the at least one chamber comprising orifices further comprises a perforated tray, and a supply of strong water enriched with ozone is caused to flow through the orifices for the treatment of water containing halogenated ethylene for at least one of use and consumption by humans.

4. The method according to claim 1, wherein the ozone exposed flow of water comprises water containing ozone at a value of at least 0.1 ppm substantially in an entire area of exposure to the electron radiation, and wherein the water to be treated has a level of quality which is suitable for drinking, except for halogenated ethylenes.

5. The method according to claim 1, wherein the process further comprises:

adjusting concentration of ozone in the water to be treated to at least 1 ppm upon entering into said area of exposure to said electron radiation.

6. The method according to claim 5, wherein:

said step of exposing a quantity of said water to electron radiation comprises exposing a quantity of said water to electron radiation having an energy level of at least 0.5 MeV.

7. The method according to claim 6, wherein:

said step of mixing comprises generating a turbulent flow.

8. The method according to claim 1, wherein:

said water to be treated is groundwater.

9. The method according to claim 1, wherein:

after adding ozone and exposing to electron radiation, the water is of drinking water quality.

10. A process for the treatment of water containing halogenated ethylenes using an apparatus having at least one electron accelerator; at least one irradiation exposure chamber arranged in an area of a cone of rays emitted by said at least one electron accelerator, said at least one chamber comprising at least one inlet and at least one outlet for a fluid medium to flow through and said chamber having a height greater than the penetration depth of the electrons from said at least one electron accelerator; a discharge line downstream of said at least one chamber, said discharge line having at least an upstream end and a downstream end; at least one strong water feed line upstream of said at least one chamber; a sensor capable of detecting an ozone content positioned at said upstream end of said discharge line; a control device connected to said sensor; at least one flow regulating member capable of controlling flow within said at least one strong water feed line; and at least one actuator for controlling said at least one flow regulating member, said process comprising:

exposing a quantity of said water to electron radiation such that the electrons do not penetrate the entire depth of said quantity of water;

maintaining an amount of dissolved ozone in said water at a value of at least 0.1 ppm substantially in an entire area of exposure to said electron radiation; and wherein said water before treatment has a level of quality which is maintained suitable for drinking with regard to amounts of components and contaminants present, with the exception of said halogenated ethylenes and at least one of ozone from a preceding treatment process and separately added ozone.

* * * * *